US007946196B1

(12) United States Patent
DePrisco et al.

(10) Patent No.: US 7,946,196 B1
(45) Date of Patent: May 24, 2011

(54) ROTARY RING TRANSFER SYSTEM

(75) Inventors: Joseph G. DePrisco, Fort Wayne, IN (US); Michael D. Rudd, Columbia City, IN (US); Matthew Lawrence, Columbia City, IN (US)

(73) Assignee: Adaptek Systems, Inc, Fort Wayne, IN (US)

( * ) Notice: Subject to any disclaimer, the term of this patent is extended or adjusted under 35 U.S.C. 154(b) by 1218 days.

(21) Appl. No.: 11/589,560

(22) Filed: Oct. 30, 2006

Related U.S. Application Data (60) Provisional application No. 60/732,383, filed on Nov. 1, 2005.

(51) Int. Cl.
  *B23B 29/24* (2006.01)
  *B23B 3/16* (2006.01)
  *B23B 7/04* (2006.01)
  *B23Q 16/00* (2006.01)
  *B23Q 17/00* (2006.01)

(52) U.S. Cl. .............. 74/813 L; 74/813 R; 29/48.5 A; 198/377.1

(58) Field of Classification Search ............ 74/813 R, 74/813 C, 822; 198/377.02, 377.1, 375; 29/38 A, 38 P; 409/221
See application file for complete search history.

(56) References Cited

U.S. PATENT DOCUMENTS

| | | | | |
|---|---|---|---|---|
| RE26,218 | E | * | 6/1967 | Thompson .................. 409/221 |
| 3,913,417 | A | * | 10/1975 | Vangor ........................ 74/822 |
| 5,579,890 | A | | 12/1996 | Harris |
| 5,682,658 | A | | 11/1997 | Roseliep |
| 5,815,902 | A | | 10/1998 | Osterried et al. |
| 5,950,790 | A | * | 9/1999 | Barber ........................ 192/139 |
| 6,178,608 | B1 | | 1/2001 | Koch |
| 6,220,116 | B1 | | 4/2001 | Warner |
| 6,273,237 | B1 | * | 8/2001 | Bazydola et al. ............ 198/375 |
| 6,293,387 | B1 | * | 9/2001 | Forster .................... 198/377.02 |
| 2003/0029697 | A1 | | 2/2003 | Green et al. |

* cited by examiner

*Primary Examiner* — Vinh T. Luong
(74) *Attorney, Agent, or Firm* — Paul W. O'Malley (57) ABSTRACT

Rotation and positioning of a rotary index table supported from a base is effected using a cam supported from a conveyor and cam follower lock, with the conveyor and cam follower lock being mounted on a carriage set for radial movement on the base inwardly and outwardly with respect to the axis of rotation of the rotary index table, and a plurality of cam followers depending from the rotary index table.

6 Claims, 11 Drawing Sheets

ROTARY RING TRANSFER SYSTEM

RELATED APPLICATION

This application is related to provisional application 60/732,383, filed 1 Nov. 2005 and claims benefit thereof.

BACKGROUND OF THE INVENTION

1. Technical Field

The invention relates to a rotary table or ring, and, more particularly, to a method and apparatus utilizing such rotary table or ring for transferring and positioning manufacturing workpieces.

2. Description of the Problem

Rotary transfer machines are advantageously applied to positioning articles for machining, assembly and/or processing where multiple operations are necessary for completion. An exemplary use of rotary transfer machines is to machine close tolerances into die cast workpieces. Rotary transfer machines typically rotate and index workpieces from station to station via a rotary index table (sometimes referred to as a "Lazy Susan") mounted in the center of the stations. A drive control, typically a geneva drive mechanism or a two face gear coupling, performs intermittent indexing and rotating of the index table to cycle the workpieces sequentially through the stations.

Obtaining access to multiple surfaces of an article or workpiece undergoing processing is an advantage of rotary index tables, though there have been limitations even here. The rotary index table typically has mounted thereon several clamping pallets that hold workpieces in position. The machine tools may drive a spindle radially inward into the workpiece towards the center of the table, or may work vertically above the workpiece, or may work at an angle therebetween. The clamping pallets may either be fixed relative to the rotary index table or capable of being rotated, tilted or otherwise moved relative to the rotary index table by mounting the pallets on satellite tables that are rotatable relative to the index table. By rotating the satellite table, more sides of the workpiece are exposed to allow for machining of more sides of the workpiece. It is much less desirable to move or rotate the workpiece relative to the index table once it is locked into position for a variety of reasons. One reason is that doing so decreases the tolerances between different machining operations performed at different stations because there are two different axes of rotation which allows for play between rotational axes. Another reason is that cycle time is increased which results in an inefficiency reducing the production rate of the rotary transfer machine. Yet another reason is the high cost associated with providing the satellite tables and appropriate drive and positioning means for selectively positioning each of the satellite tables.

Thus rotary index tables have found limited success, particularly in use of manufacturing stations or cells. One drawback to the use of such rotary index tables, is the necessity of having the processing or work stations about the outer periphery of table which causes the workstations to be directed radially inward toward the center of the table. This geometry creates problems in work stations access and visibility during tooling setup, production, and maintenance procedures.

Tolerance problems regarding starting, stopping, locking, and combined rotation of the table limit usefulness of the rotary table in some applications. Controllability of the rotation of the table has been previously accomplished with rotational gear type drives or expensive digital servomotors and the like. Further, precision in flatness and location of rotary table during use has, in the past, been insufficient.

In view of the foregoing, there is a need for a rotary table that provides improved access to the workpiece and eliminates undesirable movement introduced by conventional drive mechanisms, and introduces exact and highly stable positioning, without sacrificing the benefits of inexpensive construction and precision in rotation and flatness.

SUMMARY OF THE INVENTION

According to the present invention there is provided an automated parts transfer platform, having increased modularity and access to the workpiece. Such modularity of the system reduces total part system integration time, creates simplicity of design, and eases potential future reconfiguration and reuse of the system.

Standardized automated process station configurations also increase the flexibility in the modular design, and can easily be tooled or retooled for a wide array of automated process operations.

In one form, the system platform comprises a eight, twelve, or multiple position rotatable ring element, that can advance parts or workpieces in a rotary and high precision, synchronous movement. Functioning in theory similar to a conventional rotary indexing dial, the system offers a low cost method for part and workpiece transfers. In one aspect, the system utilizes an open ring (flat torus), rather than a solid plate indexing dial (rotating disk). This creates the advantage and option of positioning tooling and automated process stations in the inner open area of the ring facing outward for substantially better access and observation of process flow and operation. Further, the system permits additional stations to be located on the outer peripheral edge, expanding the capability of the system and provides top and bottom access to the workpiece without rotation of the workpiece on the table.

Another advantage to assembling self contained, easy to remove stations in interior positions, is that it significantly reduces the overall machine footprint as compared to current available systems.

In another form, the system includes a precision programmable servo drive motor and can lock features for a smooth advance (either clockwise or CCW rotation) cycle, and high precision lock and locate mechanism. The drive system is further modular, to allow for removal and replacement in different locations on the system, along with removal for simple repairs with minimal down time, thereby eliminating major teardowns.

The system accepts modular automation process stations. Each such station can be individually interconnected with robust network I/O links, quick release mountings, and modular utility connections. The stations may comprise self-contained electronics, and plumbing combined in an integrated package, thereby only requiring minutes to remove from the system instead of hours.

The modular stations offer advantages during the design and build process as well as during end-user production runs. Modular stations attachable to the system can be built, debugged, or repaired off line. Some replacement stations could be available as drop-in replacements for part style changeovers or in the event of calibration or maintenance issues with the original station.

The invention also includes increased support, utilizing vertical bearing supports located at the outer ring diameter versus a center hub, which increases strength and improves levelness of the ring during operation.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

By way of overview, the rotary ring dial or ring table transfer unit system 20 is useful in various processing methods and manufacturing tasks and activities that are preferably executed upon a workpiece, article, or other such part. Stated otherwise, the invention of the embodiments of the ring dial transfer and manufacturing system disclosed herein are carried out and constructed to perform on or create an article of manufacture.

Figure 1:
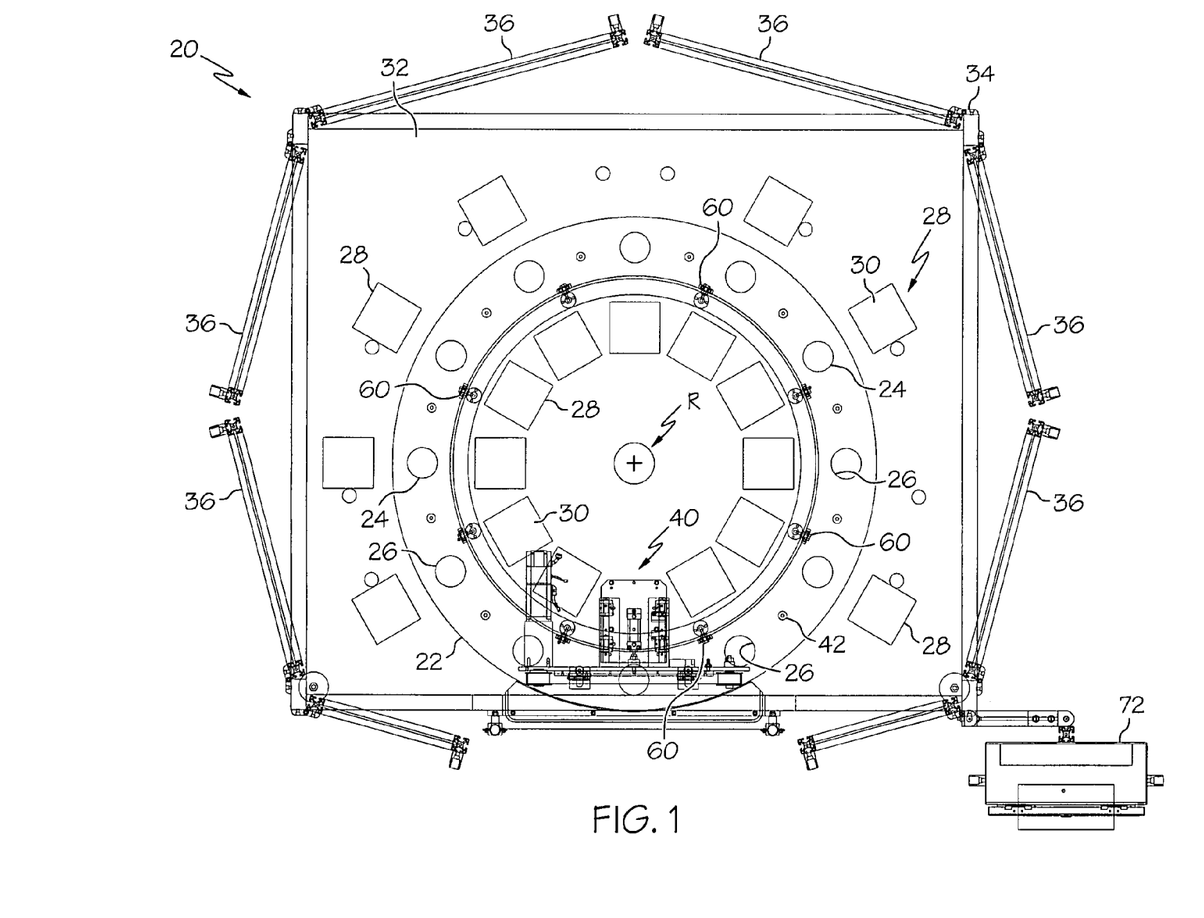
FIG. 1 is a top plan view of one embodiment of the present invention.

According to one aspect of the present invention, the system 20, as shown in a top view FIG. 1, includes a flat ring 22, that upon which are located processing areas 24, about which may be located holes 26 through ring 22. Ring 22 may take several forms, such as a torus, ring or solid disk. These are referred to generically in the claims as rotary dials or index tables. Holes 26 permit the processing stations 30 at times to access parts or workpieces from the direction of the bottom of ring 22. The embodiment of FIG. 1 shows a twelve station ring with twelve processing areas 24. Not all processing areas 24 and holes 26 are labeled in FIG. 1. Alternate embodiments may contain greater or fewer stations and processing areas.

Ring 22 may be formed monolithically, or in connectable substantially pie shaped pieces. In one form of the invention, ring 22 may be formed of aluminum or other metal that may be hard coat anodized or otherwise hardness controlled for use with rollers. A most preferred size of ring 22 is 48 inches outside diameter and 36 inch inside diameter.

Ring 22 is essentially floating, and rotatably secured (via ring supports 60 in a manner to be discussed hereinafter) to a base or table 32 of conventional construction which operates as a flat and level reference point for attachment of ring 22, ring supports ring drive mechanism 40, and processing stations 30 (at modular processing station attachment points 28). Ring supports 60 allow the table to be lifted for replacement, maintenance and changeover. As shown in the embodiment illustrated in FIG. 1, there are twelve processing station attachment points 28 located within ring 22, and twelve located exterior to ring 22. The processing station attachment points 28 are standardized such that they have substantially the same layout and capacity for supplying utilities to processing stations 30 that may or may not be attached. They are illustrated as being substantially radially opposed. The utilities provided may include, but are not limited to fluids, air pressure, suction pressure, fluid pressure, water, electrical service (AC and/or DC), gas service, data connectivity, or other services.

In the embodiment of FIG. 1, there is room for processing stations 30 (not shown) both to the exterior and interior of ring 22. Ring drive mechanism 40 takes up one processing station attachment point 28 of the eight or twelve available, either exterior and interior to ring 22. Though the ring drive mechanism is shown in an inboard location it can be moved to the outside.

Other embodiments of the system may have greater or lesser number of processing stations 30. The system is surrounded preferably by a safety cabinet structure 34 with hinged doors 36 able to be closed to secure entry to system 20.

Figure 2:
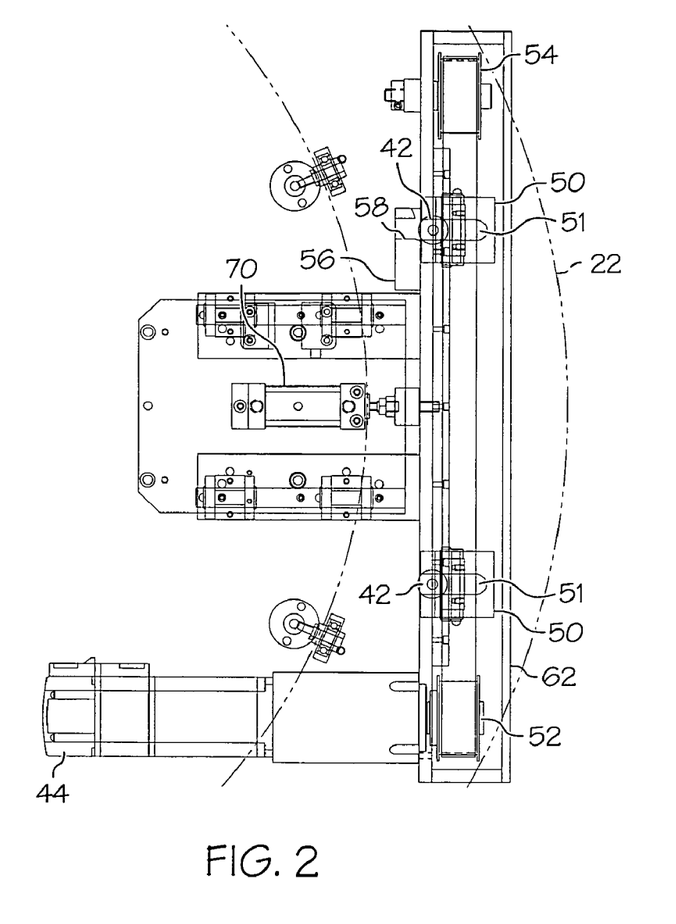
FIG. 2 is a top plan enlarged fragmentary view of the drive mechanism shown in FIG. 1 including the edges of ring 22 and cam followers 42.

The ring drive mechanism 40 of the present invention is shown in greater detail in FIG. 2, and the principal behind its operation is illustrated in FIGS. 12A-F. Generally, the drive mechanism 40 acts as a cam drive, in which the mechanism grasps and temporarily connects to at least one cam follower 42 mounted on the bottom of ring 22, then rectilinearly moves cam or cam followers 42, thereby rotating ring 22 a precise and known amount. The main advantage of the advance/lock operation of drive mechanism 40 is the fact that in a combined motion, the advance engagement tooling is combined with the cam lock tooling to allow, in one motion, the drive to move from advancement to the lock position without ever disengaging the ring through a "freewheeling" position.

More particularly, ring drive mechanism 40 includes a servo-motor 44 and gear reducer or gear box 46 for driving means such as an endless belt 48 (or other means such as a roller chain, ball screw, cable, band, or others, referred to generically as a "linear translation sub-system") to which the cam follower bearing blocks 50 attach. Belt 48 on one end engages a drive pulley 52 connected to gear box 46, and at the other end, an idler or take up pulley 54.

Figure 8:
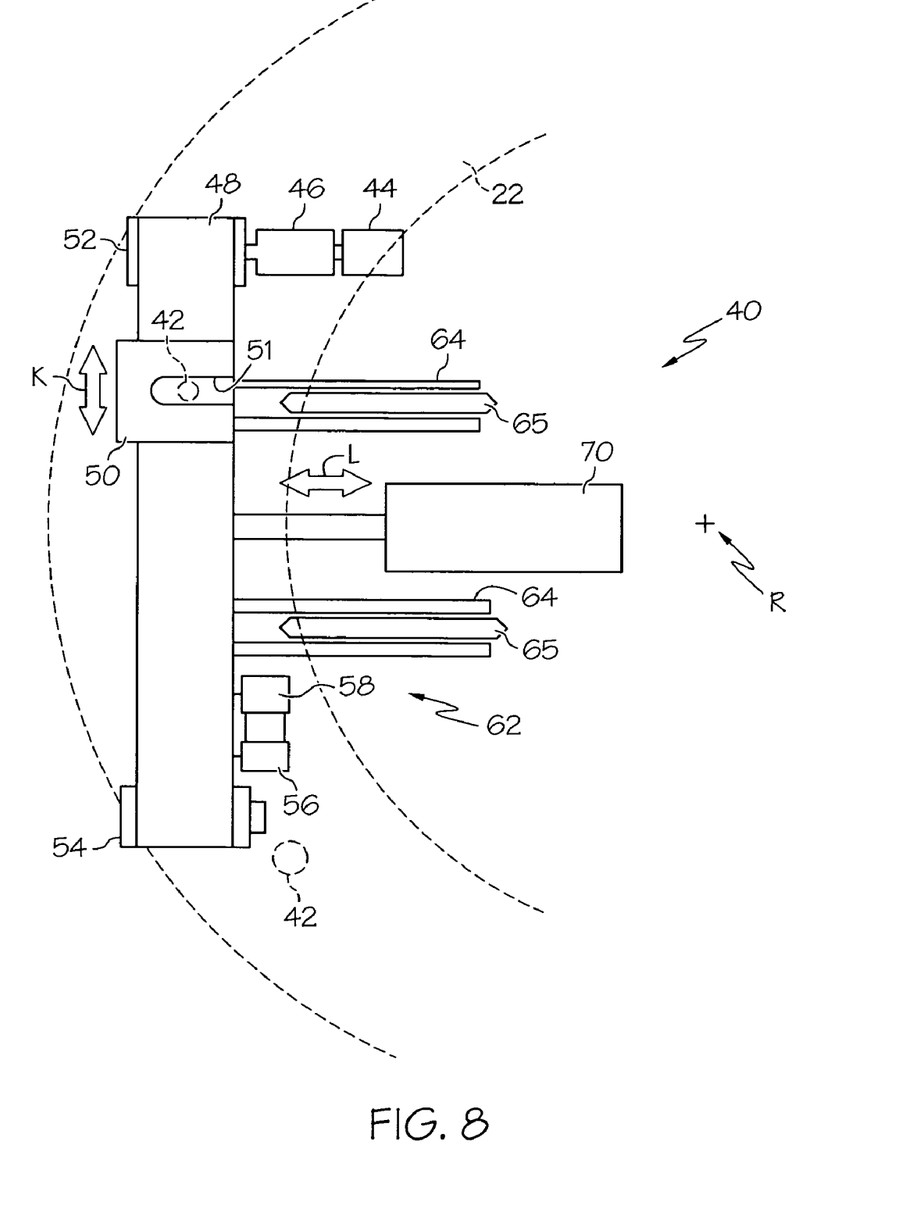
FIG. 8 is a partial top plan view of a bearing car or carriage which moves and positions the cams of the drive mechanism.
Figure 9:
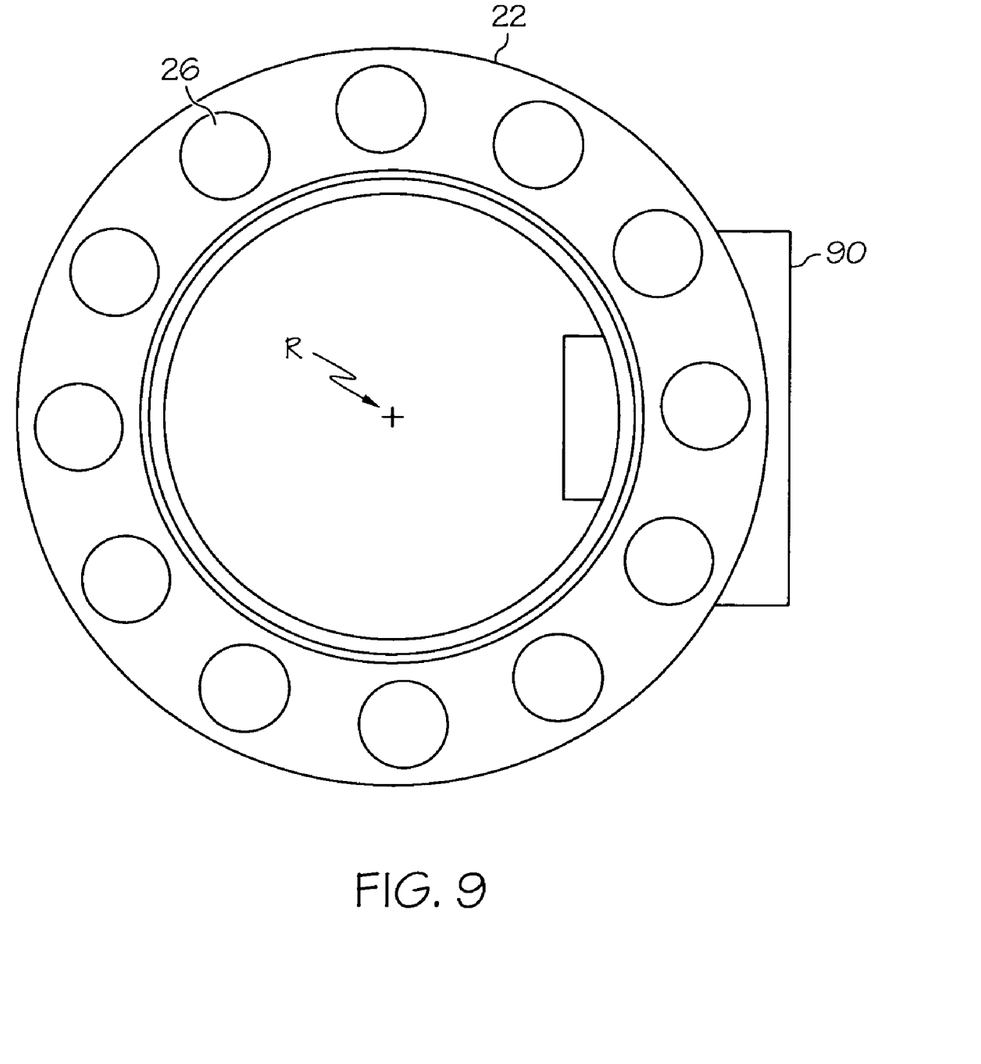
FIG. 9 is a top plan view of a torus usable as an index ring in one embodiment of the invention.

In one form of the invention, one or more cam follower bearing blocks 50 are attached to belt 48 (or linear actuator). During operation of the invention, cam follower bearing blocks 50 are available to: 1) capture cam follower 42; 2) move cam follower 42 via a rectilinear movement of bearing block 50 as it is moved via servomotor 44, gear box 46, drive pulley 52 and belt 48; and 3) locate cam follower 42 relative to a lock member 56. Rotary ring dial system 20 is designed that once assembled ring 22 is always positively one of captured and driven or locked, such that the location and placement of ring 22 has a high degree of precision. In one form of the invention, lock member 56 includes a beveled or chamfered channel 58 into which cam follower 42 may interfit and lock. FIGS. 8 and 9 show an enlarged view of the drive system 40 being in either a drive position or locked position, respectively.

Figure 3:
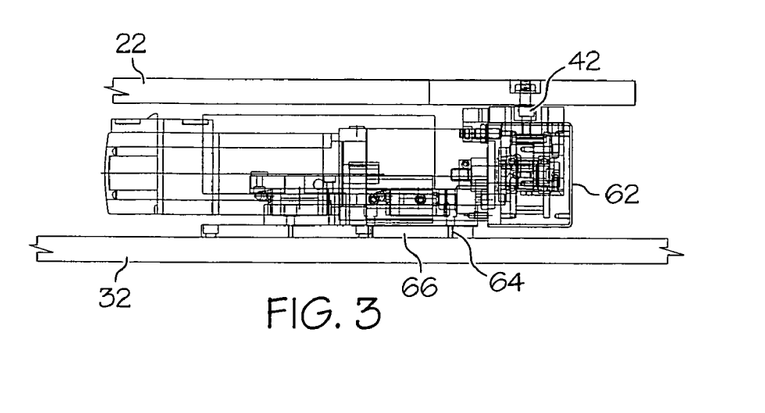
FIG. 3 is a side-elevational fragmentary view of the drive mechanism shown in FIG. 2.

The assembly of servomotor 44, gear box 46, pulleys 52, 54 and belt 48, along with cam follower bearing blocks 50 and lock member 56 are all carried upon a bearing car or carriage 62 (FIGS. 2 and 3). This bearing car/carriage is mounted upon a linear bearing 64 that may include a subplate 66 and possibly rails, supported from base table 32 on rails 65 which are oriented so that carriage 62 moves radially inwardly and outwardly on the axis of rotation "R" in the center of ring 22. The subplate 66 has a complementary footprint that fits any one of the modular processing station attachment points 28, such that drive unit 40 may be located about table 32 in a modular, removably lockable connection. Such modularity of use of the connection points, that is drive 40 having the same connection type and style as the processing stations 30, permits later movement of drive 40 to a different location, if necessary, for alternate applications and uses of ring table transfer station 20. Such similarity of drive connection (in the present case, subplate 66) and processing stations 30 allow greater flexibility of design and redesign than that of prior devices.

Figure 12A:
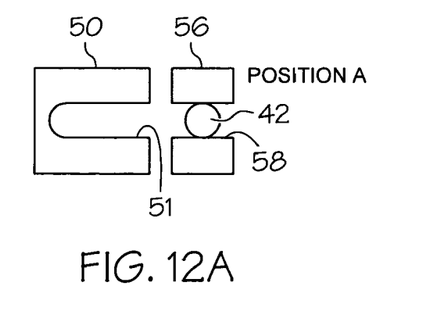
FIGS. 12A-F are schematics illustrating operation of the drive mechanism.
Figure 12B:
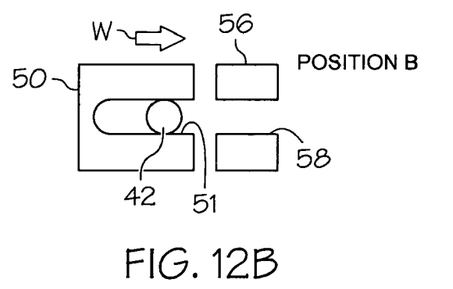
Figure 12C:
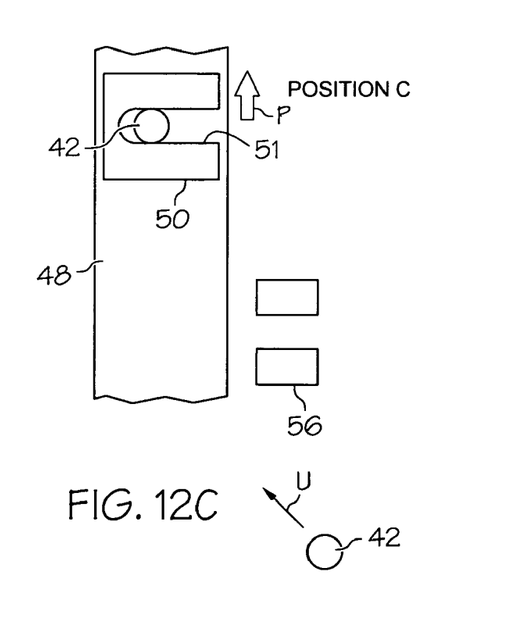
Figure 12D:
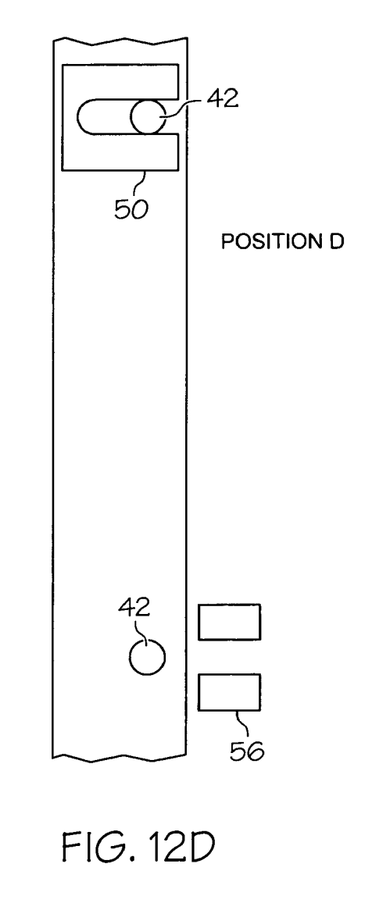
Figure 12E:
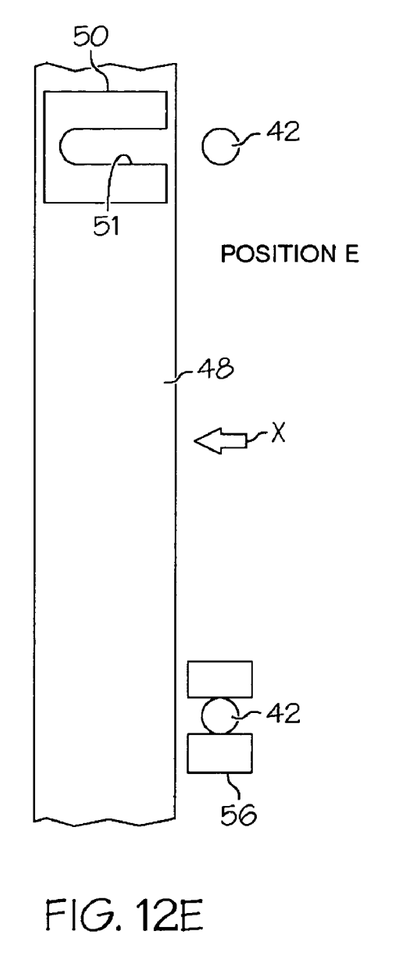
Figure 12F:
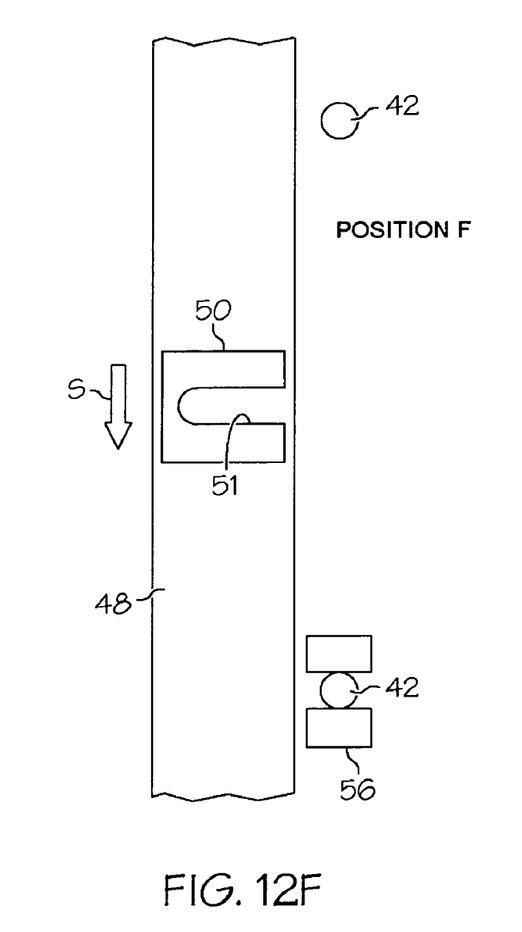

Relative movement of a cam follower 42 between a cam follower bearing block 50, more particularly from within a channel 51 in cam follower bearing block 50, to the lock channel 58 within lock member 56 is caused by movement of bearing car/carriage 62 along linear bearing 64. To effectuate movement of bearing car/carriage 62 a double acting cylinder drive 70 is utilized that is connected between sub plate 66 and bearing 62. Cylinder drive 70 is either pneumatically or hydraulically driven including a double solenoid valve and provides a bi-directional linear actuator for the bearing car/carriage 62. The structure of positive capture of cam follower 42 either within cam follower bearing block 50 or lock member 56 prevents a disengagement of cam follower 42 from either block 50 or member 56 on a potential loss of fluid pressure or unknown system shutdown or problem. The structure permits the system on energization of wake up, of precisely homing or initially placing ring 22, via a captured cam follower 42. Extension of cylinder 70 causes bearing car/carriage 62 to slide radially outwardly as seen from ring 22, to the right of the drawing and thereby cause cam follower 42 as it sits under ring 22, to translate from a captured position or driving position as shown in enlarged FIG. 12B, to a locked position as shown in FIG. 12A. For clarity, it should be noted that cam follower 42 is not moving during the locking maneuver, it is bearing car/carriage 62 that is translating upon linear bearing 64 on rail 65 (shown in FIG. 4), causing lock member 56 with channel 58 to engage and lock about cam follower 42. Retraction of the cylinder 70 operates the system in reverse, causing lock member 56 to release cam follower 42 to cam follower bearing block 50, for subsequent movement and ring 22 rotation.

Figure 4:
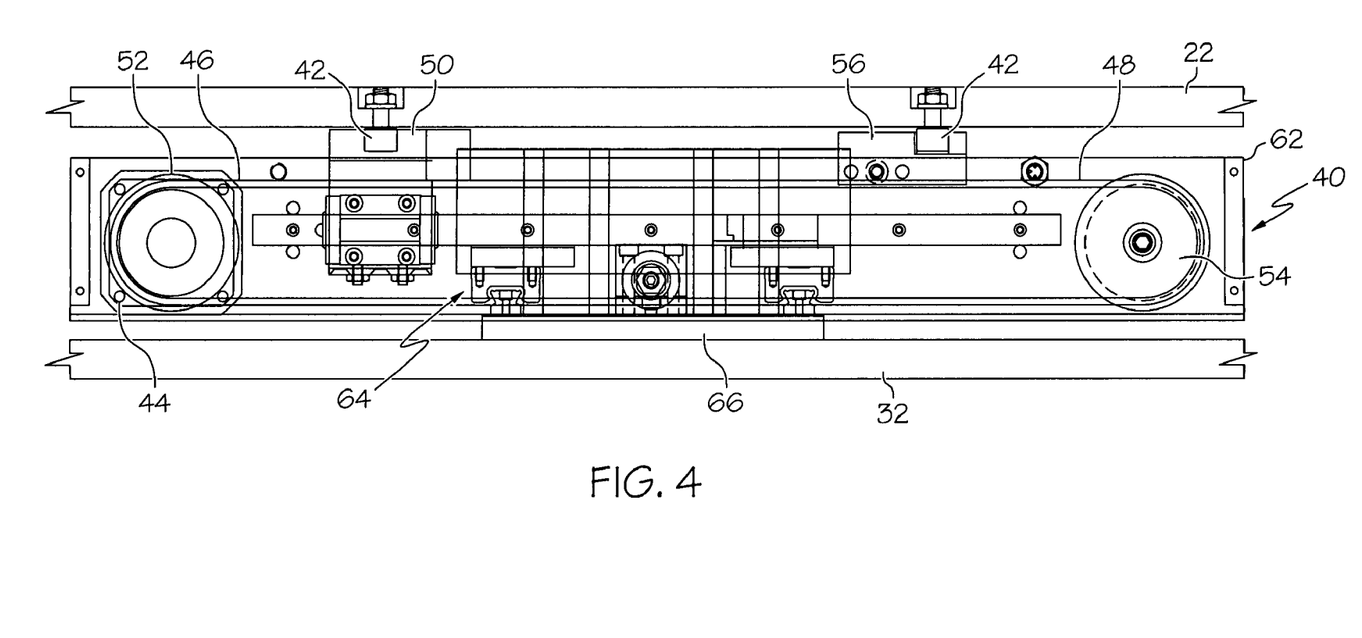
FIG. 4 is a back-elevational fragmentary view of the drive mechanism shown in FIG. 2.

FIG. 4 shows a back elevational view of the ring drive mechanism 40 at a full home position.

Operation and control of the servo motor 44 and cylinder drive 70 to correctly radially place and lock ring 22 is controlled by a standard programmable logic controller (PLC) 72 such as, for example only, an Allen Bradley PLC using traditional ladder logic, or more preferably, an object oriented man-machine interface program. A plurality of sensors (not shown) are used as inputs to the PLC to capture particular machine states and locations of parts, for example cylinder 70 (extension/retraction), servo motor 44, belt 48, safety devices such as light curtains (about ring 22) and even possibly the location of ring 22. Through use of PLC 72, it is possible to program acceleration, deceleration, and direction of ring 22 through controlled movement of belt 48. Alternatively, the system could be run by an appropriately programmed computer, including a personal computer.

Figure 5:
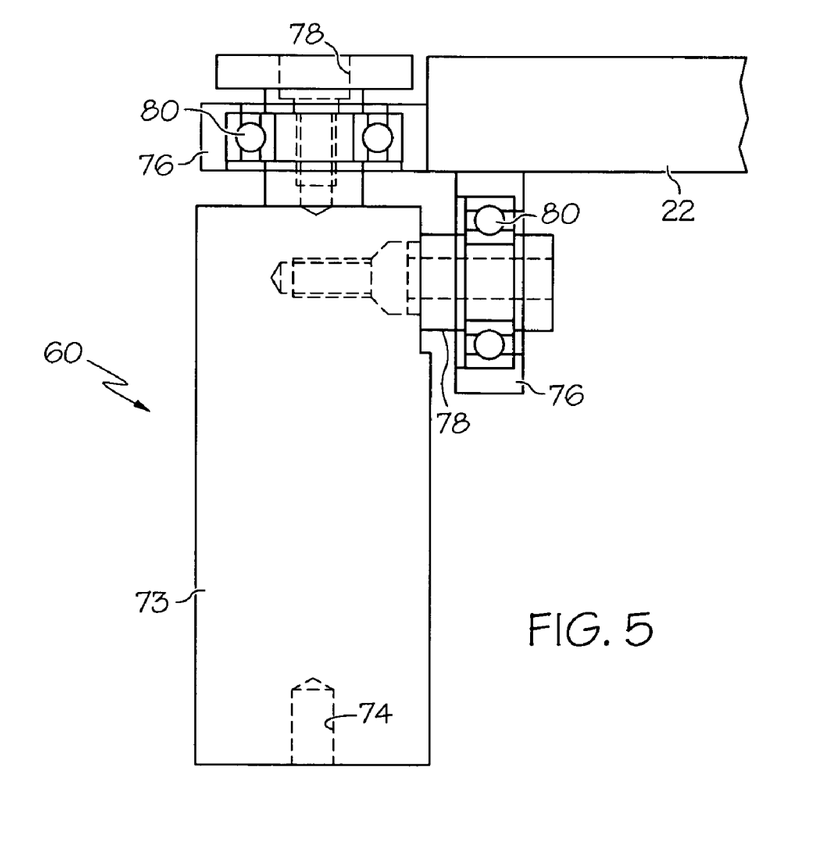
FIG. 5 is a side-elevational view of a representative bearing utilized in the present invention.
Figure 6:
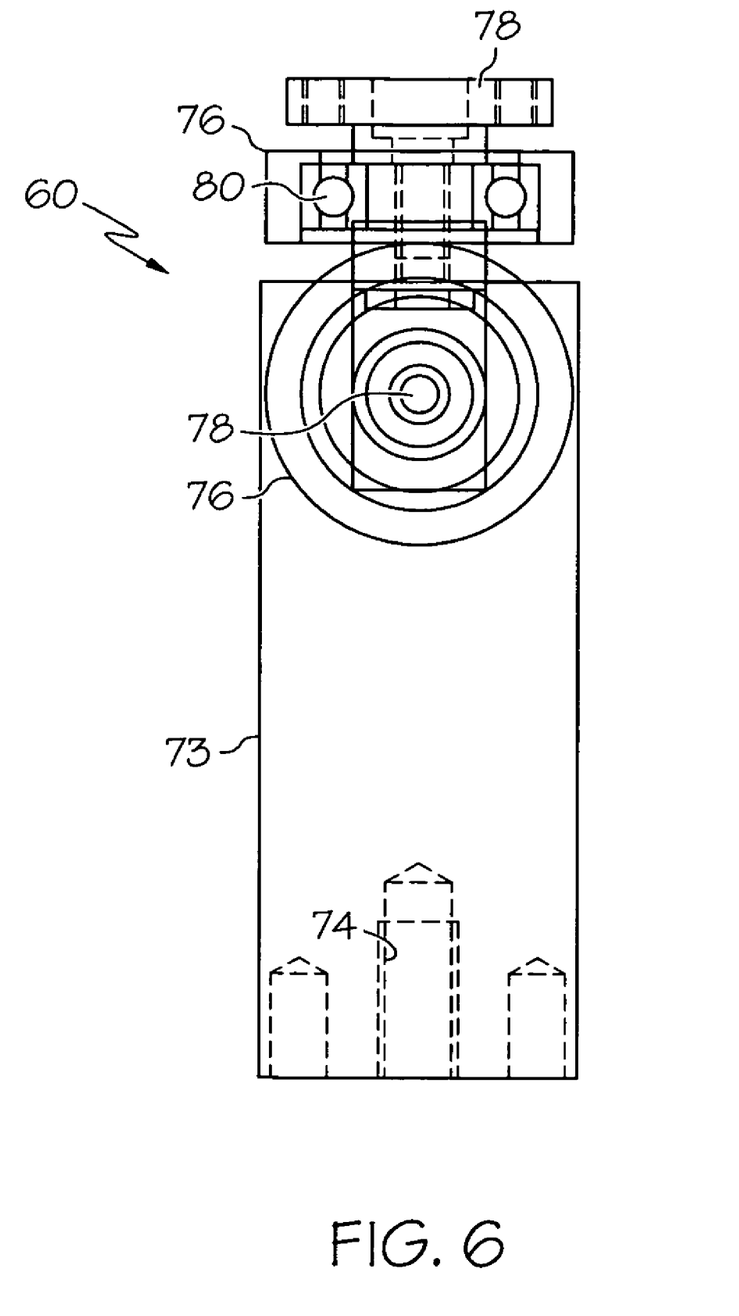
FIG. 6 is a front elevational view of the representative bearing shown in FIG. 5.
Figure 7:
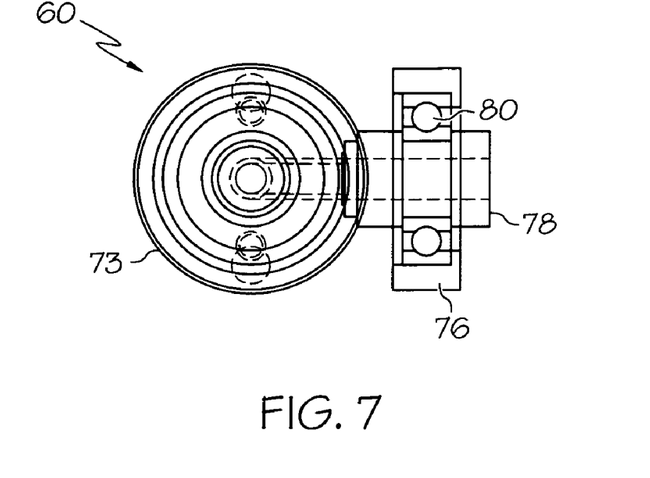
FIG. 7 is a top view of the representative bearing shown in FIG. 5.

Floating ring 22 is oriented and located by a plurality of ring supports 60 spread out equal distantly on an interior surface of ring 22 as shown in FIG. 1. Ring 22 sits upon, rotates upon, and is located by ring supports 60 and in FIG. 1 such supports are adjacent the interior diameter of ring 22. As shown, ring supports 60 locate and fix the axis of rotation of ring 22 and its location vertically above table 32. FIGS. 5 through 7 shown a ring support in more detail. A typical ring support 60 having a pillar member 73 that is attachable to base table 32, as by a fastener such as for example a bolt (not shown) that would fit into a bore 74.

Pillar member 73 creates the standoff distance of ring 22 from base plate 32 permitting the placement of ring drive mechanism 40 substantially below ring 22. Pillar member 73 includes replaceable rotary bearing members 76 connected there to by means of a fastener 78, such as a bolt, dell ring cap or device to permit removal and replacement of the bearing members 76. Possibly utilized are anti-friction bearings 80 as shown, for reduced friction rotation of bearing members 76. Based on the present disclosed design, individual bearing members 76 may be replaced without ring 22 being removed from its rotary location above table 32. Similarly, the ring design allows for rapid and simple removal of the entire ring from the system with minimal tools for repairs or change of machine setups.

FIG. 8 illustrates the bearing car or carriage 62 of drive mechanism 40, which, with double acting cylinder 70, moves and positions the cam follower bearing block 50 and cam lock 56 of the drive mechanism. Double acting cylinder 70 operates as a linear actuator to move carriage 62 radially inwardly and outwardly as indicated by double arrow "L". Linear bearings 64 mounted on rails 65 keep the motion linear. Several portions of the mechanism are carried on carriage 62 including principally the endless belt which carries cam block 50 back and forth as indicated by arrow "K" and locking cam 56. Elements of the mechanism which support movement of belt 48, that is pulleys 52, 54, servo motor 44 and step down gears 46 are also part of carriage 62.

Figure 10:
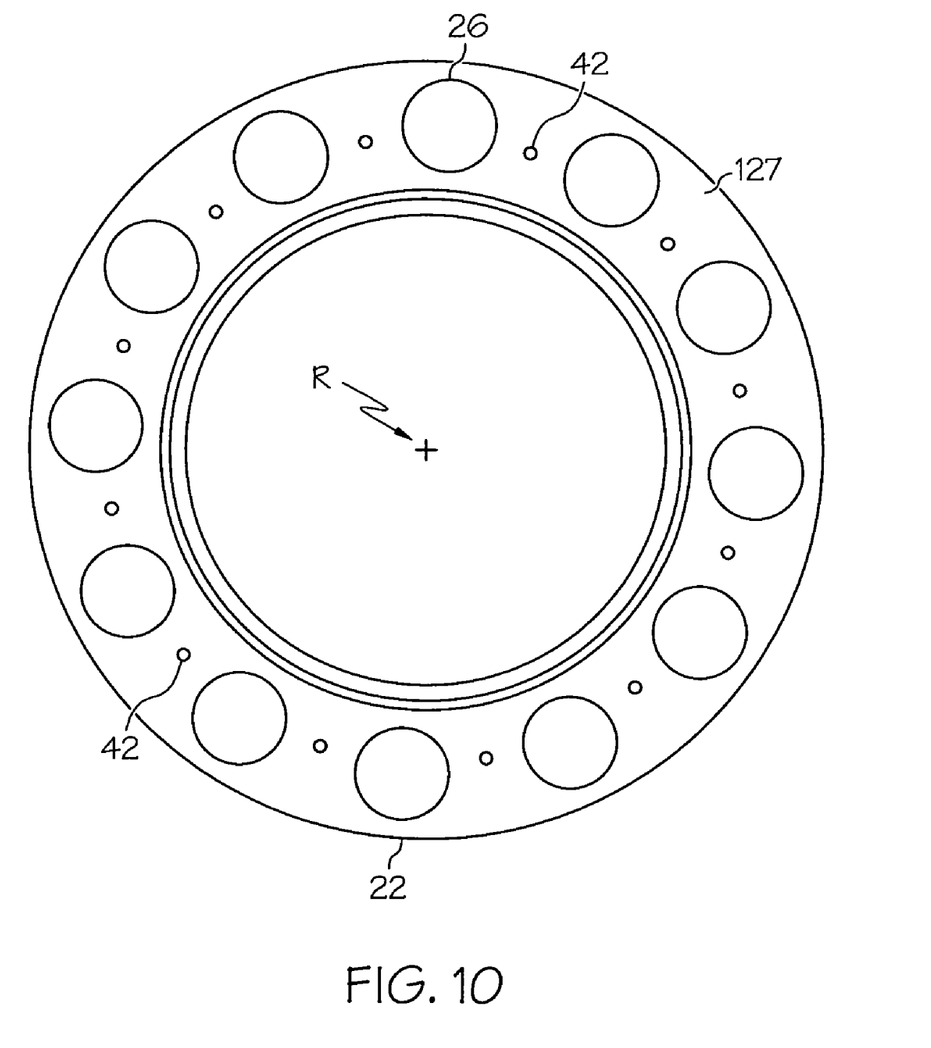
FIG. 10 is a bottom plan view of the torus of FIG. 13.

FIGS. 9 and 10 illustrate a torus 22 which serves as the index ring in the preferred embodiment of the invention. Fitting of a guard 90 around the ring, which remains stationary as the ring rotates is illustrated. The location of holes/apertures 26 through the torus or ring 22, equal in number to the number of possible workstations in a particular configuration and distributed radially equally around the torus, is shown. Holes 26 make it possible to process a workpiece mounted on the ring 22 from underneath. The location of cam followers 42 on the bottom face 127 of ring 22. Cam followers 42 are preferably cylindrical and mounted to rotate on axes parallel to the axis of rotation of torus/ring 22.

Figure 11:
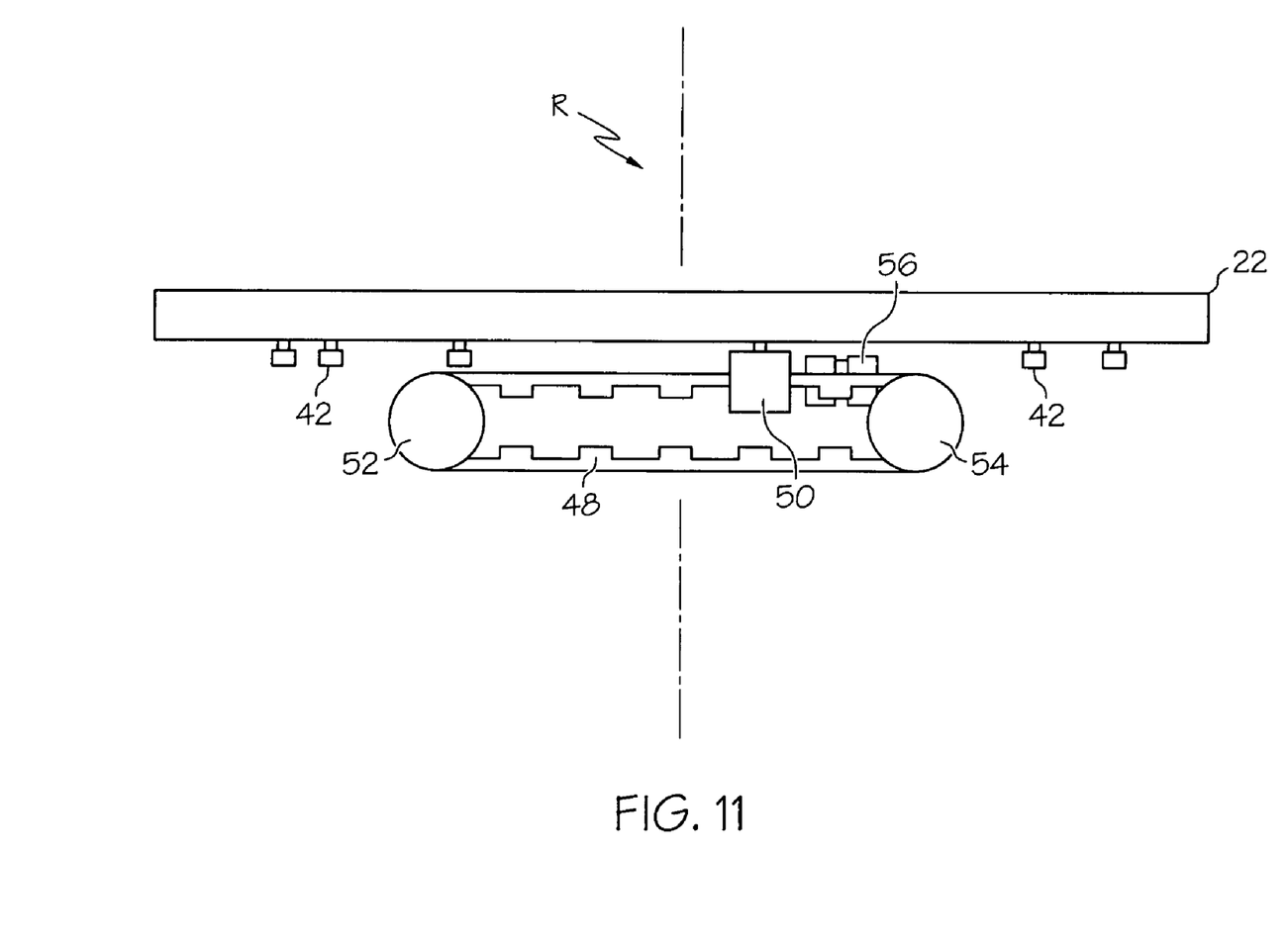
FIG. 11 is a front elevation of the continuous belt drive portion of the drive mechanism.

FIG. 11 is a front elevation of the continuous belt 48 drive portion of the drive mechanism. Continuous drive belt 48 is a timing belt mounted on pulleys 52 and 54 for bi-directional linear movement. Drive belt 48 carries cam follower bearing block 50 from positions opposite cam lock 56 to positions displaced from the cam lock. Cam followers 42 are carried from the bottom face of torus/ring 22 and engage cam follower bearing block 50 for indexed movement of the ring.

FIGS. 12A-F illustrate operation of the drive mechanism for indexed movement and positioning of torus/ring 22. In Position A, a cam follower 42 is caught and locked in cam lock 56. As illustrated, cam follower 42 fits tightly into channel 58 in cam lock 56, which has the effect of positioning ring/torus 22 positively and precisely for machining operations. A cam follower bearing block 50 is shown positioned opposite cam lock 56. To index torus 22 it must first be unlocked. In Position B carriage 62 has been repositioned in the direction indicated by the arrow "W", resulting in cam lock 56 being pulled away from around cam follower 42 and cam block engaging the cam follower in channel 51 as illustrated. The fit between channel 51 and a cam follower 42 need not be as tight as the fit between the cam follower and channel 58. Continuous belt 48 may now be engaged to move the cam follower 42 and thereby rotate ring/torus 22. Both cam lock 56 and cam follower bearing block 50 are shown with channels 58, 51, respectively, for engagement with cam follower 42. Engagement sections could be provided other than the channels shown. Cam follower bearing block 50 and its channel 51 may be termed generically as a "cam".

Position C illustrates transition of the ring/torus 22. As continuous belt 48 moves, the cam follower 42 engaged at Position B moves with it in the direction indicated by arrow "P" perpendicular to direction "W". A second cam follower 42 rotates into position proximate to cam lock 56 until continuous belt 48 reaches the end of its allowed travel, shown in Position D. From Position D the carriage 62 moves in the direction indicated by arrow "X", disengaging one cam follower 42 from cam follower bearing block 50, and engaging the second cam follower 42 in cam lock 56. Next, continuous belt 48 runs in the opposite direction as previously, returning cam block 51 (its transition is shown as Position "F") to a position proximate to cam lock 56 as shown in Position A.

The present invention provides a highly predictable, mechanically simple, yet highly accurate system for operating a rotary indexing table. Functioning in theory similar to a conventional rotary indexing dial, the system offers a low cost method for part and workpiece transfers. In one aspect, the system utilizes an open ring (flat torus), rather than a solid plate indexing dial (rotating disk). This creates the advantage and option of positioning tooling and automated process stations in the inner open area of the ring facing outward for substantially better access and observation of process flow and operation. Further, the system permits additional stations to be located on the outer peripheral edge, expanding the capability of the system. Another advantage to assembling self contained, easy to remove stations in an outboard orientation, is that it significantly reduces the overall machine footprint as compared to current available systems. In another form, the system includes a precision programmable servo drive motor and can lock features for a smooth advance (either clockwise or CCW rotation) cycle, and high precision lock and locate mechanism. The drive system is further modular, to allow for removal and replacement in different locations on the system, along with removal for simple repairs with minimal down time, thereby eliminating major teardowns. The system accepts modular automation process stations. Each such station can be individually interconnected with robust network I/O links, quick release mountings, and modular utility connections. The stations may comprise self-contained electronics, and plumbing combined in an integrated package, thereby only requiring minutes to remove from the system instead of hours. The modular stations offer advantages during the design and build process as well as during end-user production runs. Modular stations attachable to the system can be built, debugged, or repaired off line. Some replacement stations could be available as drop-in replacements for part style changeovers or in the event of calibration or maintenance issues with the original station. The invention also includes increased support, utilizing vertical bearing supports located at the outer ring diameter versus a center hub, which increases the levelness of the ring during operation.

While the invention is shown in only a few of its forms, it is not thus limited but is susceptible to various changes and modifications without departing from the spirit and scope of the invention.

What is claimed is:

1. A rotary transfer and indexing system comprising:
   a base;
   a rotary index table having opposed major planar surfaces, the rotary index table being supported on the base for rotation about an axis;
   a plurality of cam followers extending from a major surface of the rotary index table;
   a carriage supported for radial translation on the base relative to the axis of rotation of the rotary index table;
   a linear translation sub-system carried by the carriage, the linear translation subsystem being disposed for movement parallel to the plane of the major planar surface of the rotary index table and substantially perpendicular to the direction of translation of the carriage; and
   a cam follower bearing block carried by the linear translation sub-system for temporarily engaging with one of the plurality of cam followers.

2. A rotary transfer and indexing system as set forth in claim 1, further comprising:
   a cam lock mounted on the carriage to allow selective engagement and disengagement of the cam lock with one of the plurality of cam followers with movement of the carriage.

3. A rotary transfer and indexing system as set forth in claim 2, further comprising:
   the rotary index table being a torus or ring;
   base stations located on the base adjacent the torus or ring.

4. A rotary transfer and indexing system as set forth in claim 3, the linear translation sub-system further comprising:
   an endless belt mounted over spaced pulleys; and
   a bi-directional servo motor coupled to one of the pulleys for driving the endless belt in either of two directions.

5. A rotary transfer and indexing system as set forth in claim 4, further comprising:
   a bi-directional linear actuator coupled to the carriage for moving the carriage.

6. A rotary transfer and indexing system as set forth in claim 5, further comprising:
   at least a first aperture through the rotary index table.

* * * * *